Sept. 20, 1949.  M. COHN  2,482,575
AERIAL MOUNTING
Original Filed Dec. 11, 1947
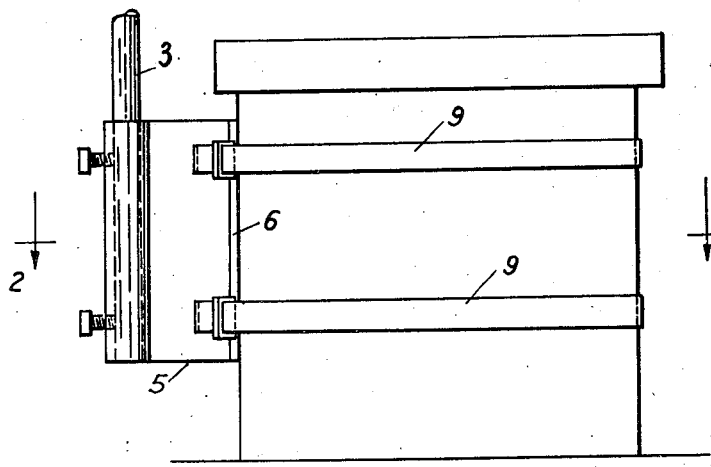
Fig. 1
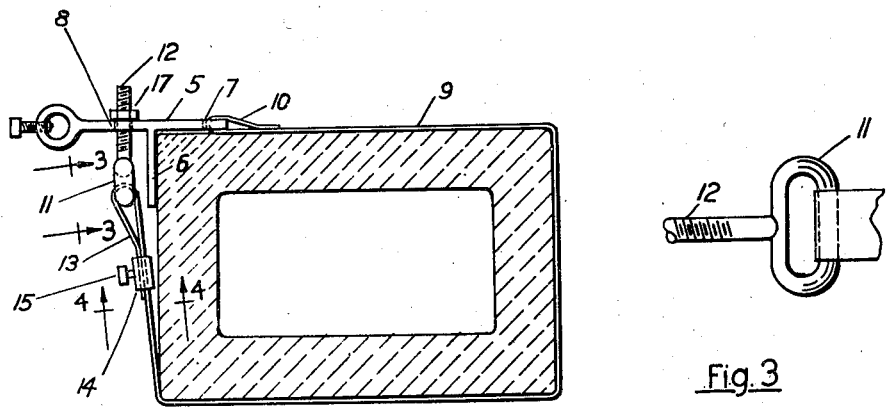
Fig. 2
Fig. 3
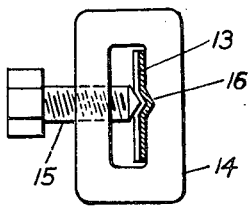
Fig. 4
INVENTOR.
MAX COHN
BY Patented Sept. 20, 1949

2,482,575

UNITED STATES PATENT OFFICE 2,482,575

AERIAL MOUNTING

Max Cohn, South River, N. J., assignor to South River Metal Products Company Inc., South River County, N. J.

Original application December 11, 1947, Serial No. 791,015. Divided and this application June 17, 1949, Serial No. 99,649

4 Claims. (Cl. 248—43)

This application is a division of my copending application Serial No. 791,015, filed December 11, 1947.

This invention relates to aerial mountings, flags or markers, and more especially to a device serving to mount aerial masts on chimneys, poles, cornices and the like, of various diameters.

It is an object of the invention to provide a mounting consisting of a few parts of simple construction and which can be fixed to a chimney by unskilled hands and in view of their simplicity, can be assembled cheaply and sold at a low price.

In the drawing affixed to this specification and forming part thereof a preferred embodiment of my invention is shown diagrammatically by way of example.

In the drawing:

Fig. 1 is a side view, and

Fig. 2 is a cross-section on the line 2—2 in Fig. 1 of a chimney with the new mounting attached thereto.

Figs. 3 and 4 being side elevations, drawn to a larger scale, of two fixing and tightening members, respectively.

Referring to the drawing, 1 is the chimney and 5 is one web of a T-beam one half of which serves to hold in position an aerial mast 3; the other half of web 5 forms together with web 6 an angle fixture adapted to be seated on and grip a corner of the chimney. The free end of the web 5 is formed with two slots 7 arranged in spaced superposition.

Through each slot 7 extends one end of a steel band 9, which is doubled up and by welding or riveting is formed into a loop 10. The other end of each steel band passes through the eye 11 of a screw bolt 12 (Fig. 3) seated in one of the holes 8. This end is doubled up also and formed into a loop 13 held in position by means of a sleeve 14 (Fig. 4) provided with a set screw 15 in one and with a depression 16 facing this screw in the opposite side wall of the sleeve 13. Into this depression the point of set screw 15 will force the two reaches of the steel band 9 passing through the sleeve 14 and will thus lock them therein. If the nuts 17 are screwed home on the bolts 12, the bands 9 encircling the chimney will be tightened and firmly secure the aerial in position.

Obviously any other well known tightening device may be substituted for the screw bolts 12. Generally speaking, I wish it to be understood that I do not desire to be limited to the details of construction shown in the drawing and described in the specification, for obvious modifications will occur to a person skilled in the art.

I claim:

1. An aerial mounting comprising an inflexible corner piece to fit the vertical corner of a chimney, at least one flexible tape adapted to extend around the chimney lying flat thereagainst and tensionably linked to said corner piece; linking means including an eye bolt mounted on said corner piece for gradual adjustment, a loop of the tape passing through the ear bolt, and registering indentations in said tape and clamping means cooperating therewith for stepwise adjustment of the loop.

2. An aerial mounting comprising a two-armed gripping element, the arms extending at a rigid angle to each other, a mast holder mounted at the back of said element, a screw member adjustably mounted on one arm for gradual tightening, means for linking a flexible tape to the other arm of said element, at least one flexible tape extending from said linking means through an opening in said screw member so as to form a loop; and registering indentations in said tape and clamping means cooperating therewith for stepwise adjustment of the loop.

3. An aerial mounting comprising in combination, a three-armed gripping element, a mast holder on one arm, a screw member adjustably mounted on said arm for gradual tightening, linking means on another arm forming a rectilinear extension of said one arm, a further arm in rigid connection with and perpendicular to said two arms, at least one flexible tape extending from said linking means through an opening in said screw member so as to form a loop; and registering indentations in said tape and clamping means cooperating therewith for stepwise adjustment of the loop.

4. An aerial mounting comprising in combination, multi-arm gripping means including two arms extending at a rigid angle to each other, a mast holder on another arm forming an extension of one of said two arms, a screw member adjustably mounted on said other arm for gradual tightening, linking means on said one arm, at least one flexible tape extending from said linking means through an opening in said screw member so as to form a loop; and registering indentations in said tape and clamping means cooperating therewith for stepwise fixation of the loop.

MAX COHN.

No references cited.